Patented Aug. 18, 1936

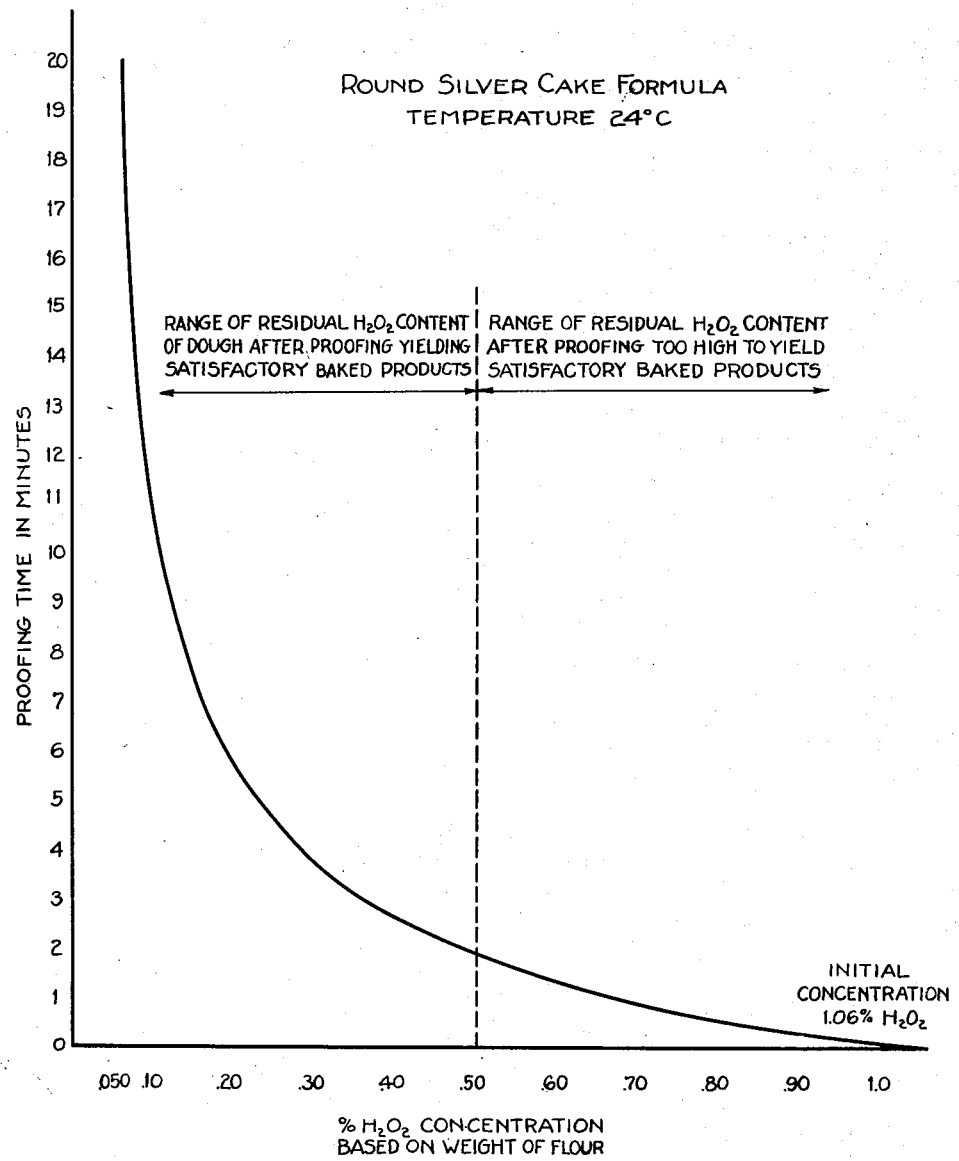

2,051,745

UNITED STATES PATENT OFFICE 2,051,745

LEAVENING PROCESS

Joseph S. Reichert, Niagara Falls, N. Y., and William J. Sparks, Urbana, Ill., assignors to E. I. du Pont de Nemours & Company, Incorporated, Wilmington, Del., a corporation of Delaware Application March 31, 1934, Serial No. 718,466

7 Claims. (Cl. 99—90)

This invention relates to the production of baked raised products such as bread, cake, biscuits and the like and is a continuation in part of an application filed in the names of Reichert and Sparks, S. N. 655,680, on February 7, 1933, now Patent No. 1,953,567. More specifically, the invention herein disclosed relates to a use of hydrogen peroxide to effect the raising of the products before and during baking, the products being allowed to proof for a time prior to baking but more residual hydrogen peroxide being permitted to remain in the dough prior to its introduction into the oven.

In the copending application S. N. 655,680, now Patent No. 1,953,567 it has been stated that a certain maximum amount of hydrogen peroxide may be allowed to remain in the dough before baking, it having been found advantageous to permit a small percentage of the peroxide to remain undecomposed at the time the loaf is put into the oven. It is the discovery disclosed in that application that proofing should continue until the hydrogen peroxide remaining in the dough does not exceed about 0.08% based on the weight of the flour therein, regardless of the starting hydrogen peroxide concentration. The aforementioned Patent Number 1,953,567 teaches that the proofing time is to be determined by the time required for the dough to reach a hydrogen peroxide concentration of 0.08% or less, which time varies with the amount added at the start, the activity of the flour, and the presence or absence of stabilizers or catalysts therein.

It has now been determined that under some circumstances it may be possible and desirable to allow more than 0.08% hydrogen peroxide to remain in the dough at the conclusion of the proofing period and prior to the introduction of the batter into the oven. More specifically, we have found that under conditions of slow baking amounts of hydrogen peroxide up to, but not exceeding 0.50% may be allowed to remain undecomposed in the batch at the time of its introduction into the dough, and still obtain a baked product which is of high quality.

There are circumstances in commercial practice, particularly in the baking of cakes, wherein it is desirable to bake the product at a slow rate. There are three main ways in which this can be accomplished and it is normally carried out in this manner in commercial bake-shops. First the oven temperature may be maintained relatively low, at 325° F. or below; second the cake or other baked product may be baked in a "box" such as is customary in the "box cakes" of commerce; and third the product, during baking, may be maintained out of contact with the direct heat of the oven by being held or supported on racks or other supports within the oven structure. Another condition frequently met with which gives slow baking is when relatively large cakes or large loaves of bread are baked.

All three of these conditions are occasionally met with in commercial baking. Although oven temperatures of 360° F.-420° F. are more usual in present day baking practices, frequently bakers find it desirable to maintain the oven temperature at 325° F. or below, thereby producing a "slow baked" product. Metal pans provided with wooden liners on the sides and asbestos liners on the bottoms are also in common use particularly in the production of the commercial cake which is known as a "box cake". In this method of baking, all, or the greater portion, of the heat to which the cake is subjected and which results in the baking is supplied at the exposed face of the dough which is the only surface not protected against heat conduction by the wooden sides or asbestos bottom of the "box". Frequently, the products are baked, not on the floor or hearth of the oven, but on suspended trays, racks, or supports within the oven and out of contact with direct heat thereof. All these methods of preventing the dough from attaining too high a temperature and from being brought too rapidly up to a dough temperature, which is always at the boiling point or below, are in common commercial use although they are employed only under special conditions and for baking what may be termed special baked products.

We have now found that where the slow method of baking is selected it is possible to permit amounts of hydrogen peroxide greater than 0.08% and up to 0.50% based on the weight of the flour used, to remain in the dough at the time the panned batch is introduced into the oven. Under slow conditions of baking, either by maintaining the oven at 325° F. or below, or by employing an insulated box, or by suspending the product to be baked on a rack out of direct contact with the heat of the oven, the hydrogen peroxide remaining undecomposed at the time the dough is introduced into the oven has been found to have undergone complete decomposition at the time the product is baked, even when the maximum value of 0.50% hydrogen peroxide is present at the end of the proofing period.

This may be attributed to the fact that the catalase in the dough mixture is not completely destroyed under conditions of slow baking as quickly as under normal baking conditions. Accordingly, since as disclosed in the copending application previously referred to, the catalase present in the dough mixture brings about decomposition of the hydrogen peroxide after the dough is in the oven, it is possible to have undecomposed peroxide in the dough at the time of its introduction into the oven and still get a satisfactory baked product.

The relationship between proofing times (period between introduction of the hydrogen peroxide and the placing of the dough in the oven) and residual hydrogen peroxide content is illustrated by the graph. The abscissae represent the quantities of hydrogen peroxide remaining in the batter before its introduction into the oven and the ordinates represent the time between the introduction of hydrogen peroxide and the placing of the dough in the oven, or the "proofing period". The curve is based upon a commercial dough batter used extensively for preparing cakes and the ingredients thereof are given in the example appended to and forming a part of the specification. About 1.06% hydrogen peroxide by weight, based on the quantity of flour in the dough, was introduced as a leavening agent.

It will be noted that a line has been drawn vertically on the graph at the value of residual hydrogen peroxide representing 0.50% which corresponds approximately to a proofing period of about two minutes. Values of hydrogen peroxide to the right of this line have been marked as yielding too large residual hydrogen peroxide content in the dough at the time of placing in the oven to permit the production of satisfactory baked products. Those values of hydrogen peroxide to the left of this vertical line are indicated as yielding satisfactory results in the preparation of baked products. The graph readily indicates suitable proofing times which may be employed in order to regulate the hydrogen peroxide content at the time the dough is introduced into the oven. It is possible to predetermine hydrogen peroxide content by regulating the proofing time.

The curve shows the relationship between proofing time and residual hydrogen peroxide content for a usual commercial cake batter. Should a lower catalase flour be used the curve would tend to be slightly displaced to the right but, within the range of residual hydrogen peroxide content from 0.8%–0.50% the curve for a low catalase activity batter would substantially coincide with the one given on the graph. For a high catalase activity flour the curve would tend to be slightly displaced to the left, but, within the range of 0.08%–0.50% hydrogen peroxide content of the dough at the time the dough went into the oven, which is the range with which this application is concerned, here again the curve representing the high catalase activity batter would be practically identical with that of the graph.

It should be understood therefore, that by slow baking we mean any one of the three factors specified. The products may be baked at a slow rate by maintaining the oven temperature at 325° F. or below, or by baking the cake in the insulated "box" used commercially to produce "box cakes" such as one which has wooden liners on the sides and an asbestos liner on the bottom, or by suspending the dough to be baked in the oven out of contact with direct heat thereof. Under all three of these circumstances, which we have denominated slow baking, amounts of hydrogen peroxide up to 0.50% may be allowed to remain in the dough at the time of its introduction into the oven or conclusion of the proofing period. Wherever we specify slow baking in the claims or elsewhere, throughout the specification, these are the conditions which are intended and by slow baking we mean a method employing one of the three procedures discussed.

Cakes baked with hydrogen peroxide content by slow baking within the range of 0.08%–0.50% hydrogen peroxide remaining in the dough at the time of its introduction into the oven, which are the cakes contemplated by this invention, have been found entirely satisfactory and contain no free hydrogen peroxide at the end of the baking period. They raise satisfactorily and the baked products have been found to be whiter and lighter than corresponding baking powder or yeast leavened products. The texture has been unusually even and the product is in this respect much superior to the ordinary commercial cakes. The test used in determining the presence of residual hydrogen peroxide was the customary qualitative one of potassium iodide described in Patent No. 1,953,567 and is extremely sensitive and will reveal very small quantities of free peroxide in starch containing materials.

*Example*

A cake batter consisting of the following ingredients was prepared as described below:

| | | |
|---|---|---|
| Granulated sugar | gm | 349 |
| Salt | gm | 6.5 |
| Shortening (hydrogenated oil product) | gm | 175 |
| Dried egg albumen | gm | 6.25 |
| Water | cc | 38.4 |
| Egg whites | gm | 179 |
| Milk | cc | 280 |
| Flour | gm | 453 |
| Vanilla extract | gm | 6.5 |
| Hydrogen peroxide (100 volume) | cc | 15.4 |

The hydrogen peroxide amounted to about 1.06% by weight of the flour in the batter. The cake was prepared by the following procedure.

The sugar, salt and shortening were blended and creamed for five minutes. The egg whites and egg albumen were then added and the mixture lightly creamed for three to four minutes. Part of the milk, containing the vanilla extract, and all of the flour were added alternately and the batter mixed until smooth. The remainder of the milk to which the hydrogen peroxide had been added as leaven was mixed with the batter.

After mixing the batch was placed in the pans or molds and introduced into the oven. The time between the introduction of the hydrogen peroxide and the placing of the boxes, with insulated sides and bottoms, containing the batter in the oven was approximately two and a half minutes. The hydrogen peroxide content at the time the cake was placed in the oven was 0.418% based on the weight of the flour in the batter.

A baking temperature of 300–325° F. was maintained for one hour and thirty-five minutes. At the end of that time there was no free hydrogen peroxide present therein as determined by the sensitive potassium iodide test. The texture of the cakes was very even and free from objectionable voids, the color was light, and the flavor excellent. In all respects the cakes were Grade A commercial products.

The details of the procedure described in this application are intended to be illustrative and not restrictive and the scope of our invention is to be judged solely by the breadth of the appended claims.

We claim:

1. A method of preparing slow baked raised products without yeast or carbon dioxide evolving materials which comprises incorporating with the dough ingredients in amounts sufficient to act as the leaven therefor, an oxygen evolving compound decomposable in the mixture, proofing until the hydrogen peroxide equivalent is between 0.08 and 0.50% by weight of the dry flour used and then baking, said amount of said oxygen evolving compound remaining at the termination of proofing being substantially completely decomposed before the temperature at which catalase destruction occurs is reached in the dough during said baking step.

2. A method of preparing slow baked raised products without yeast or carbon dioxide evolving materials which comprises incorporating with the dough ingredients in amounts sufficient to act as leaving therefor, a peroxygen compound decomposable in the dough mixture, proofing until the hydrogen peroxide equivalent is between 0.08 and 0.50% by weight of the dry flour used, and baking, said amount of peroxygen compound remaining in the dough mixture at the termination of proofing being substantially completely decomposed before the temperature at which catalase destruction occurs is reached in the dough during the baking step.

3. A method of preparing slow baked raised products without yeast or carbon dioxide evolving materials which comprises incorporating hydrogen peroxide with the dough ingredients in amounts sufficient to act as a leaven therefor, proofing until the hydrogen peroxide content is between 0.08 and 0.50% by weight of the dry flour used, and baking, said amount of hydrogen peroxide remaining in the dough mixture at the termination of proofing being substantially completely decomposed before the temperature at which catalase destruction occurs is reached in the dough during the baking step.

4. A method of preparing slow baked raised products without yeast or carbon dioxide evolving materials which comprises incorporating with the dough ingredients in amounts sufficient to act as a leaven therefor, an oxygen evolving compound decomposable in the mixture, proofing until the hydrogen peroxide equivalent is between 0.08 and 0.50% by weight of the dry flour used, and baking within two hours thereafter, said amount of said oxygen evolving compound remaining at the termination of proofing being substantially completely decomposed before the temperature at which catalase destruction occurs is reached in the dough during said baking step.

5. A method of preparing slow baked raised products without yeast or carbon dioxide evolving materials which comprises incorporating with the dough ingredients in amounts sufficient to act as a leaven therefor, a peroxygen compound decomposable in the dough mixture, proofing until the hydrogen peroxide equivalent is between 0.08 and 0.50% by weight of the dry flour used, and baking within two hours thereafter, said amount of peroxygen compound remaining in the dough mixture at the termination of proofing being substantially completely decomposed before the temperature at which catalase destruction occurs is reached in the dough during the baking step.

6. A method of preparing slow baked raised products without yeast or carbon dioxide evolving materials which comprises incorporating hydrogen peroxide with the dough ingredients in amounts sufficient to act as a leaven therefor, proofing until the hydrogen peroxide content is between 0.08 and 0.50% by weight of the dry flour used, and baking within two hours thereafter, said amount of hydrogen peroxide remaining in the dough mixture at the termination of proofing being substantially completely decomposed before the temperature at which catalase destruction occurs is reached in the dough during the baking step.

7. A method of preparing slow baked raised products without yeast or carbon dioxide evolving materials which comprises incorporating with the dough ingredients, hydrogen peroxide equivalent to 0.5% to 2.0% of the weight of the dry flour used, proofing until the hydrogen peroxide content is between 0.08 and 0.50% by weight of the flour, and baking, said amount of hydrogen peroxide remaining in the dough mixture at the termination of proofing being substantially completely decomposed before the temperature at which catalase destruction occurs is reached in the dough during the baking step.

JOSEPH S. REICHERT.
WILLIAM J. SPARKS.